United States Patent
Kosaka

(10) Patent No.: US 7,697,837 B2
(45) Date of Patent: Apr. 13, 2010

(54) IMAGE PICKUP APPARATUS

(75) Inventor: Takashi Kosaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 11/750,658

(22) Filed: May 18, 2007

(65) Prior Publication Data

US 2007/0280671 A1 Dec. 6, 2007

(30) Foreign Application Priority Data

May 31, 2006 (JP) .............................. 2006-152761

(51) Int. Cl.
G03B 15/03 (2006.01)
G03B 9/70 (2006.01)
G03B 7/087 (2006.01)
G03B 7/097 (2006.01)
G03B 17/18 (2006.01)

(52) U.S. Cl. ...................... 396/164; 396/166; 396/168; 396/201

(58) Field of Classification Search ................. 396/166, 396/164, 168, 201, 202, 159, 163, 155; 348/371
See application file for complete search history.

(56) References Cited

U.S. PATENT DOCUMENTS

| | | | | |
|---|---|---|---|---|
| 4,692,013 A | * | 9/1987 | Okino | 396/106 |
| 5,093,681 A | * | 3/1992 | Matsuzaki et al. | 396/163 |
| 5,528,333 A | * | 6/1996 | Lee | 396/165 |
| 6,650,834 B2 | * | 11/2003 | Ume | 396/164 |
| 2002/0064383 A1 | * | 5/2002 | Kawasaki et al. | 396/157 |

FOREIGN PATENT DOCUMENTS

| | | | |
|---|---|---|---|
| JP | 05034771 A | * | 2/1993 |
| JP | 2003-043559 | | 2/2003 |

* cited by examiner

*Primary Examiner*—W. B. Perkey
*Assistant Examiner*—Noam Reisner
(74) *Attorney, Agent, or Firm*—Cowan, Liebowitz & Latman, P.C.

(57) ABSTRACT

In an image pickup apparatus capable of setting the flash exposure amount of an external flash both in the camera and the standalone external flash, if a flash exposure compensation amount locally set in the external flash itself and that set in the camera exist, one of them is enabled. Display is changed depending upon the location of the enabled setting in order to give the user notice of the enabled flash exposure compensation amount.

3 Claims, 7 Drawing Sheets

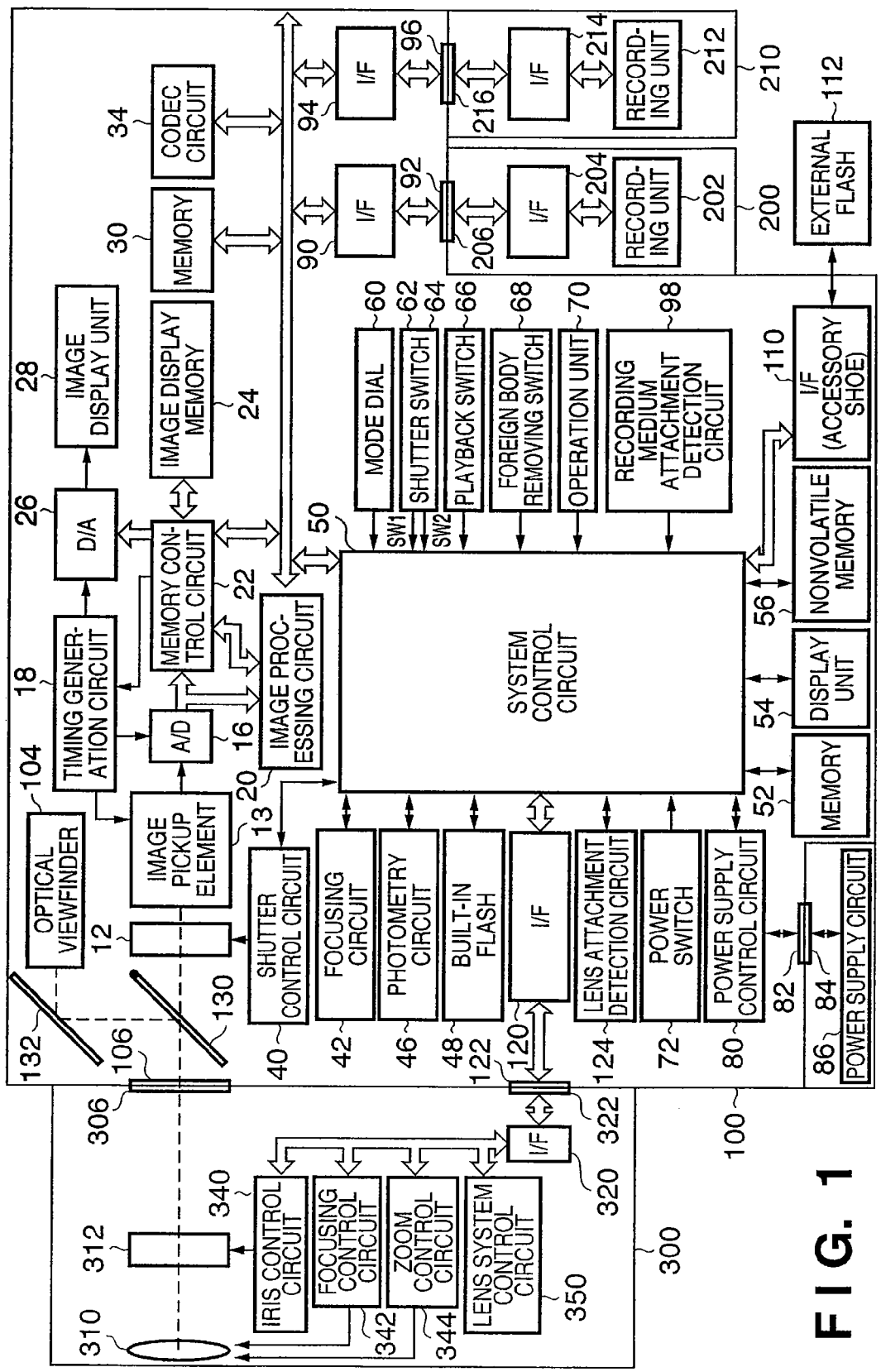
F I G. 1

IMAGE PICKUP APPARATUS

BACKGROUND OF THE INVENTION

1. Field of the Invention

The present invention relates to an image pickup apparatus and, more particularly, to an image pickup apparatus capable of flash exposure setting in an external flash.

2. Description of the Related Art

In image capture using an external flash, a user may want to manually set the amount of flashlight or compensate the automatic set value in accordance with, for example, the color or distance of the object.

However, not all external flashes can locally set the compensation amount alone. Conventionally, an image pickup apparatus capable of setting the compensation amount of flashlight (to be referred to as a flash exposure compensation amount) controls an external flash (Japanese Patent Laid-Open No. 2003-043559). This allows the user to set the flash exposure compensation amount in a single operation without being conscious of the type of external flash that is connected.

However, if an external flash capable of setting the flash exposure compensation amount on a standalone basis is used, flash exposure compensation may be set in both the external flash and the camera body. Usually, one of the set values is given a higher priority, or compensation is done on the basis the sum of the compensation amounts.

Some image pickup apparatuses display, for example, a mark to give the user notice of the flash exposure compensation setting state or the set compensation amount.

However, in a system that gives a higher priority to one of a plurality of flash exposure compensation amounts, the user cannot easily judge which one of the setting on the image pickup apparatus side and the setting on the external flash side is the priority setting. Thus, image capture may be performed with the flash exposure compensation that is not expected by the user.

SUMMARY OF THE INVENTION

The present invention has been made to solve the above-described problem of the prior art and provides an image pickup apparatus capable of clearly giving a user notice of information about flash exposure setting applied in image capture.

According to an aspect of the present invention, there is provided an image pickup apparatus capable of flash exposure compensation of an external flash, comprising: a selection unit configured to enable one of a flash exposure compensation amount locally set in a connected external flash and a flash exposure compensation amount of the external flash, which is set in the image pickup apparatus; and a notice unit configured to give a user notice of which flash exposure compensation amount is enabled by the selection unit: the flash exposure compensation amount locally set in the external flash or the flash exposure compensation amount of the external flash which is set in the image pickup apparatus.

Further features of the present invention will become apparent from the following description of exemplary embodiments with reference to the attached drawings.

BRIEF DESCRIPTION OF THE DRAWINGS

FIG. 1 is a block diagram showing an arrangement example of a lens-interchangeable type digital still camera serving as an image pickup apparatus according to an embodiment of the present invention;

DESCRIPTION OF THE EMBODIMENTS

Figure 2:
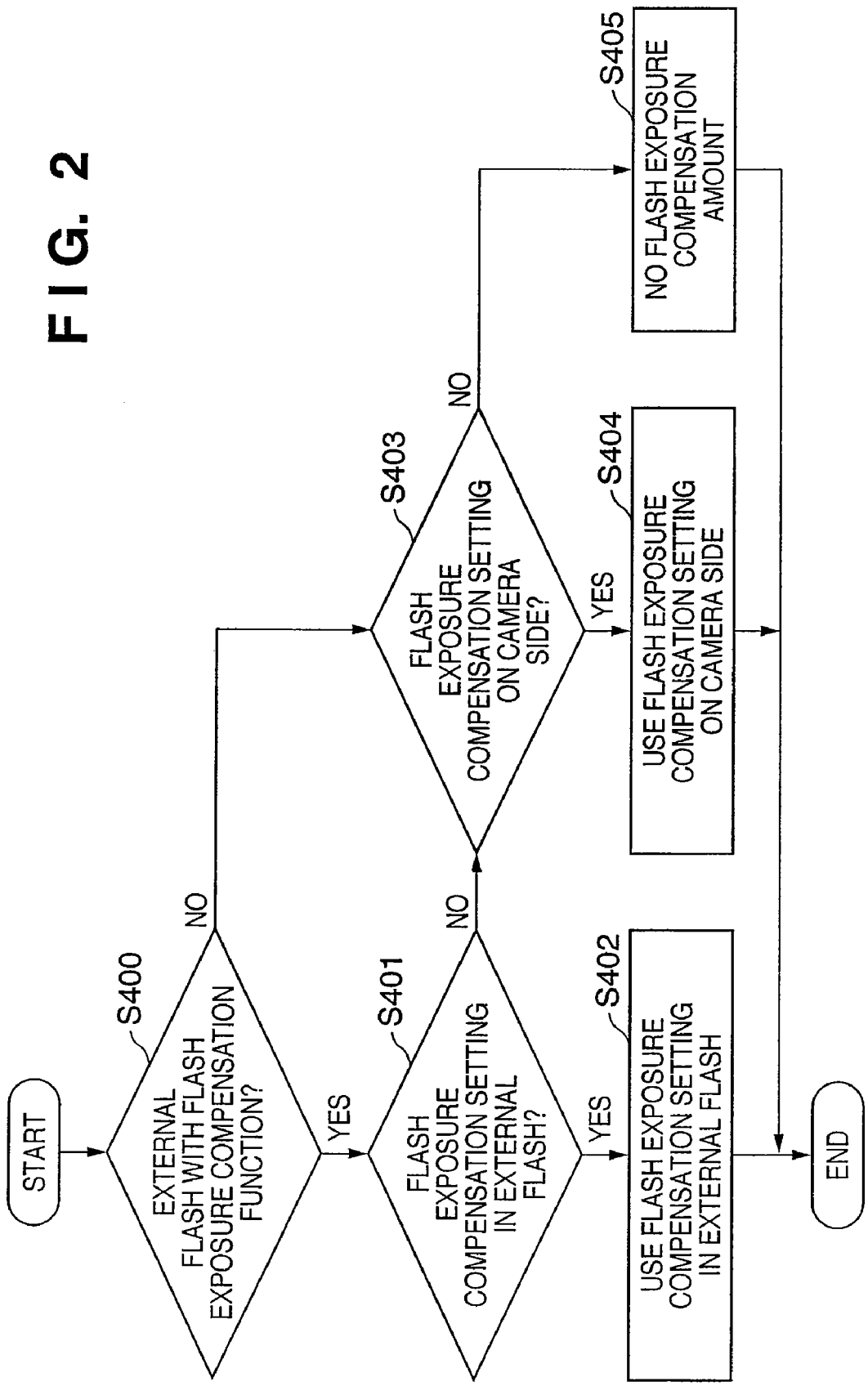
FIG. 2 is a flowchart for explaining the flash exposure compensation amount selection operation of a camera 100 according to the embodiment of the present invention.

Preferred embodiments of the present invention will now be described in detail in accordance with the accompanying drawings.

FIG. 1 is a block diagram showing an arrangement example of a lens-interchangeable type digital still camera serving as an image pickup apparatus according to an exemplary embodiment of the present invention. The image pickup apparatus of this embodiment is not limited to the digital still camera and may be an apparatus that operates as a digital still camera, including a digital video camera and a digital-camera-equipped portable phone.

A shutter 12 controls the amount of exposure on an image pickup element 13. The image pickup element 13 converts an optical image into an electrical signal.

A light beam incident on a lens 310 can form an optical image on the image pickup element 13 through an iris 312, lens mounts 306 and 106, mirror 130, and shutter 12 within a single-lens reflex scheme.

An A/D converter 16 converts the analog signal output from the image pickup element 13 into a digital signal.

A timing generation circuit 18 supplies clock and control signals to the image pickup element 13, A/D converter 16, and D/A converter 26 under the control of a memory control circuit 22 and a system control circuit 50.

An image processing circuit 20 executes a predetermined pixel interpolation process and color conversion process for data from the A/D converter 16 or memory control circuit 22.

The image processing circuit 20 executes a predetermined arithmetic process, as needed, by using captured image data. The system control circuit 50 controls a photometry circuit 46 and a focusing circuit 42 on the basis of the obtained arithmetic result, thereby implementing AF (Automatic Focusing), AE (Automatic Exposure), and EF (Electronic Flash) processes of TTL (Through-The-Lens) scheme.

The image processing circuit 20 also executes a predetermined arithmetic process by using captured image data and performs AWB (Automatic White Balance) process of TTL scheme on the basis of the obtained arithmetic result.

A digital still camera 100 (to be simply referred to as a camera 100 hereinafter) of this embodiment includes the dedicated focusing circuit 42 and photometry circuit 46. Hence, not the image processing circuit 20 but the focusing circuit 42 and photometry circuit 46 may be used to carry out the AF, AE, and EF processes.

Alternatively, the AF, AE, and EF processes may be carried out by using the focusing circuit 42 and photometry circuit 46, and then, the AF, AE, and EF processes may be performed again using the image processing circuit 20.

The memory control circuit 22 controls the A/D converter 16, the timing generation circuit 18, the image processing circuit 20, an image display memory 24, the D/A converter 26, a memory 30, and a codec circuit 34.

Data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as an LCD or organic EL display via the D/A converter 26.

Display on the image display unit 28 can arbitrarily turned on or off in accordance with an instruction from the system control circuit 50. The power consumption of the digital still camera can be reduced by turning off the display.

The memory 30 is a storage device for storing captured still images and moving images and has a storage capacity sufficient to store a predetermined number of still images and a predetermined time period of moving images. For this reason, even in the case of sequential shooting or panoramic photography, where a plurality of still images are captured continuously, an enormous amount of images can be written in the memory 30 at a high speed.

The memory 30 is also usable as the work area of the system control circuit 50.

The codec circuit 34 reads out image data from the memory 30, compresses it in accordance with a predetermined image compression method, and writes the compressed image data to the memory 30. The codec circuit 34 can also read out compressed image data from the memory 30, decompress it, and write the decompressed image data to the memory 30. Image compression defined by JPEG or JPEG 2000, or image compression using adaptive discrete cosine transformation (ADCT) or wavelet transformation can be used as the predetermined image compression method.

A shutter control circuit 40 controls the shutter 12 on the basis of photometry information from the photometry circuit 46. The shutter control circuit 40 executes this control in cooperation with an iris control circuit 340 for controlling the iris 312.

The focusing circuit 42 is used for the AF process. A light beam incident on the lens 310 is input to the focusing circuit 42 through the iris 312, lens mounts 306 and 106, mirror 130, and focusing sub mirror (not shown) by the single-lens reflex scheme. The focusing circuit 42 measures the in-focus state of an image formed as an optical image.

The photometry circuit 46 is used for the AE process. A light beam incident on the lens 310 is input to the photometry circuit 46 through the iris 312, lens mounts 306 and 106, mirrors 130 and 132, and photometric lens (not shown) by the single-lens reflex scheme. The photometry circuit 46 measures the exposure state of an image formed as an optical image.

The photometry circuit 46 also executes the EF process in cooperation with a built-in flash 48 of the image pickup apparatus.

The built-in flash 48 also has an AF auxiliary light projecting function and a flash exposure function.

In this embodiment, AF control may be done by using a measurement result of the focusing circuit 42 and an arithmetic result obtained by causing the image processing circuit 20 to arithmetically process image data captured by the image pickup element 13.

Similarly, AE control may be performed by using a measurement result of the photometry circuit 46 and an arithmetic result obtained by causing the image processing circuit 20 to arithmetically process image data captured by the image pickup element 13.

The system control circuit 50 controls the overall camera 100. The system control circuit 50 includes, for example, a CPU which controls the whole camera 100 by executing programs stored in a memory 52. The memory 52 stores constants, variables, and programs for the operation of the system control circuit 50.

A display unit 54 is formed by combining output devices such as an LCD, LED, and loudspeaker and outputs an operation state or a message by a text string, image, or sound as the system control circuit 50 executes a program. A single display unit or a plurality of display units 54 are disposed at visible points near an operation unit 70 of the camera 100. Some components of the display unit 54 are arranged in an optical viewfinder 104.

Examples of contents displayed on the LCD of the display unit 54 are the single/sequential shooting mode, self timer, compression ratio, number of recording pixels, number of recorded images, number of recordable images, shutter speed, aperture value, exposure compensation, flash exposure compensation, amount of external flash flashlight, red eye reduction, buzzer setting, battery level, error, information from a plurality of digits, the presence of recording media 200 and 210, the presence of a lens unit 300, communication I/F operation, date/time, and state of connectedness to an external computer.

Of the contents of the display unit 54, those displayed in the optical viewfinder 104 are in-focus, ready for shooting, camera shake warning, flash charge, shutter speed, aperture value, exposure compensation, and recording medium write operation.

An example of contents indicated by an LED of the display unit 54 is the recording medium write operation.

An example of contents indicated by a lamp of the display unit 54 is self-timer notification. The self-timer notification lamp may be shared by AF auxiliary light.

A nonvolatile memory 56 is an electrically erasable/recordable memory such as an EEPROM.

A mode dial 60, first shutter switch (SW1) 62, second shutter switch (SW2) 64, playback switch 66, foreign body removing switch 68, and operation unit 70 are operation members to input various kinds of operation instructions to the system control circuit 50. These operation members include a button, switch, dial, touch panel, line-of-sight detector, voice recognition unit or a combination thereof.

The operation members will be explained here in detail.

The mode dial 60 is a switch to set one of a plurality of functional photographing modes of the camera 100. Examples of the functional photographing modes are an automatic photographing mode, programmed photographing mode, shutter speed priority photographing mode, iris priority photographing mode, manual photographing mode, focal depth priority photographing mode, portrait photographing mode, landscape photographing mode, close-up photographing mode, sport photographing mode, night view photographing mode, and panoramic photographing mode.

The first shutter switch (SW1) 62 is turned on by the first stroke (e.g., half stroke) of a shutter button (not shown) provided on the camera 100. When the first shutter switch (SW1)

62 is turned on, the system control circuit 50 starts the AF process, AE process, AWB process, or EF process.

The second shutter switch (SW2) 64 is turned on by the second stroke (e.g., full stroke) of the shutter button (not shown) provided on the camera 100. When the second shutter switch (SW2) 64 is turned on, the system control circuit 50 initiates a series of processes including an exposure process, developing process, and recording process. In the exposure process, a signal read from the image pickup element 13 is written in the memory 30 as image data via the A/D converter 16 and memory control circuit 22. The image data is subjected to the developing process using the arithmetic process of the image processing circuit 20 or memory control circuit 22. Resultant data is written to the memory 30. Finally, the recording process is executed by reading out the image data after development from the memory 30, causing the codec circuit 34 to compress it, and writing the image data to the recording medium 200 or 210. In a CCD-RAW mode, the developing process and compression process are partially omitted.

The playback switch 66 initiates a playback operation comprising reading out an image captured in a photographing mode from the memory 30 or the recording medium 200 or 210 and displaying the read out image on the image display unit 28.

The foreign body removing switch 68 instructs to start a foreign body detection operation of detecting foreign bodies sticking, for example, to a lowpass filter on the image pickup element 13.

The operation unit 70 serves as a man-machine interface including a switch, button, rotating dial switch, and touch panel.

The operation unit 70 allows a user to select the image recording mode, compression ratio, and image quality of a captured image. The image recording mode includes a JPEG mode and a CCD-RAW mode. In the JPEG mode, a captured image is compressed using JPEG compression and recorded, for example, on a recording medium 200. In the CCD-RAW mode, digital data obtained by digitizing a signal from the image pickup element 13 is losslessly compressed and recorded on, for example, a recording medium 200, or recorded without compression. The user can also select the compression ratio and image quality in the JPEG mode via the operation unit 70.

The operation unit 70 includes a menu button, set button, multiwindow playback page break button, flash set button, single shooting/sequential shooting/self timer switching button, menu move + (plus) button, menu move − (minus) button, playback image move + (plus) button, playback image move − (minus) button, image quality select button, exposure compensation button, flash exposure compensation button, external flashlight amount set button, and date/time set button. The operation unit 70 also includes an image display ON/OFF switch to turn on or off the display on the image display unit 28, a quick review ON/OFF switch that sets a quick review function to automatically play back captured image data immediately after image capture, a compression mode switch to select the compression ratio of JPEG compression or select the CCD-RAW mode, a playback switch to set a functional mode such as a playback mode, multiwindow playback/erase mode, or PC connection mode, and an AF mode set switch to select a one-shot AF mode or a servo AF mode. In the one-shot AF mode, the auto-focus operation starts when the first shutter switch SW1 62 is turned on, and once an in-focus state is obtained, the state is continuously held. In the servo AF mode, the auto-focus operation is continuously performed during the ON state of the first shutter switch SW1 62.

The functions of the plus and minus buttons can also be implemented by providing a rotating dial switch and associating its rotation directions with the plus and minus directions.

A power switch 72 powers the camera 100 on or off. The power switch 72 can also power on or off various attachment devices such as the lens unit 300, external flash 112, and recording media 200 and 210 connected to the camera 100.

A power supply control circuit 80 includes a battery detection circuit, DC/DC converter, and switch circuit to select a block to be energized. The power supply control circuit 80 detects the presence of a battery, a battery type, and battery level, controls the DC/DC converter on the basis of the detection result and an instruction from the system control circuit 50, and supplies a necessary voltage to the units including the recording media 200 and 210 for a necessary period.

Reference numeral 82 denotes a connector. A power supply circuit 86 includes a primary cell such as an alkaline cell or lithium cell, a secondary cell such as a NiCd cell or Li cell, or an AC adapter.

Reference numerals 90 and 94 denote interfaces for the recording media 200 and 210 such as a memory card or a hard disk. Connectors 92 and 96 connect to the recording media 200 and 210, respectively. A recording medium attachment detection circuit 98 detects whether the recording medium 200 or 210 is attached to the connector 92 or 96.

In this embodiment, there are two systems of interfaces and connectors to attach recording media. However, the interfaces and connectors to attach recording media may have either a single or an arbitrary number of systems. Interfaces and connectors of different standards may be combined. Interfaces and connectors based on a standard such as a PC card or CF (CompactFlash®) card may be used.

When the standardized interfaces 90 and 94 and connectors 92 and 96 are used, image data and management information associated with it can be transferred to/from another computer or a peripheral device such as a printer by connecting various kinds of communication cards, including a LAN card, modem card, USB card, IEEE 1394 card, SCSI card, and a communication card for PHS.

The optical viewfinder 104 guides a light beam incident on the lens 310 through the iris 312, lens mounts 306 and 106, and mirrors 130 and 132 within the single-lens reflex scheme so that an optical image can be formed and displayed. Image capture can be accomplished using only the optical viewfinder 104 without using the electronic viewfinder function of the image display unit 28.

An interface 120 is provided in the lens mount 106 to connect the camera 100 to the lens unit 300. A connector 122 electrically connects the camera 100 to the lens unit 300. A lens attachment detection circuit 124 detects whether the lens unit 300 is attached to the lens mount 106 or connector 122.

The connector 122 also has a function of transmitting control signals, status signals, and data signals between the camera 100 and the lens unit 300 and supplying currents of various voltages. The connector 122 may be used for transmission not only in telecommunication but also in optical communication and speech communication.

The mirrors 130 and 132 can guide a light beam incident on the lens 310 to the optical viewfinder 104 using the single-lens reflex scheme. The mirror 132 can be either a quick return mirror or a half mirror.

The recording media 200 and 210 include a memory card or a hard disk. The recording media 200 and 210 comprise recording units 202 and 212 formed, for example, from a semiconductor memory or a magnetic disk, interfaces 204 and 214 to the camera 100, and connectors 206 and 216 to be connected to the camera 100, respectively.

The lens unit 300 is of lens-interchangeable type.

The lens mount 306 mechanically couples the lens unit 300 to the camera 100. The lens mount 306 includes various functions for electrically connecting the lens unit 300 to the camera 100.

The camera 100 also includes the photographing lens 310 and the iris 312.

An interface 320 is provided in the lens mount 306 to connect the lens unit 300 to the camera 100. A connector 322 electrically connects the lens unit 300 to the camera 100.

The connector 322 also has a function of transmitting control signals, status signals, and data signals between the camera 100 and the lens unit 300 and receiving or supplying currents of various voltages. The connector 322 may be used for transmission not only in telecommunication but also in optical communication and speech communication.

The iris control circuit 340 controls the iris 312 on the basis of photometry information from the photometry circuit 46. This control is performed in cooperation with the shutter control circuit 40 that controls the shutter 12.

A focusing control circuit 342 controls focusing of the lens 310. A zoom control circuit 344 is provided when the lens 310 is a zoom lens. The zoom control circuit 344 controls zooming.

A lens system control circuit 350 controls the entire lens unit 300. The lens system control circuit 350 incorporates, for example, a CPU, volatile memory, and nonvolatile memory. The volatile memory stores constants, variables, and programs for the operation. The nonvolatile memory holds identification information such as a number unique to the lens unit 300, management information, function information such as a full aperture value, minimum aperture value, and focal length, and current and past set values.

The relationship between the external flash 112 and the camera 100 of this embodiment will now be described.

The system control circuit 50 measures a state under ambient light and a state under a preflash fired by the external flash 112 using the photometry circuit 46. The system control circuit 50 calculates the amount of flashlight necessary for image capture on the basis of the measurement result. The obtained amount of flashlight is given to the external flash 112 by serial communication via the system control circuit 50 and accessory shoe 110. When capturing an image, the external flash 112 emits light of the calculated amount. This is autoflash exposure.

To compensate the amount of flashlight in autoflash exposure or use a fixed flashlight amount without autoflash exposure, the flash exposure compensation setting function or fixed flashlight amount setting function of the external flash 112 itself is used. If the external flash 112 has none of these functions, the user sets the flash exposure compensation amount or fixed amount of flashlight in the camera 100 by operating the operation unit 70. The system control circuit 50 instructs the external flash 112 to compensate flash exposure or emit light in the fixed amount, thereby executing autoflash exposure compensation or light emission in the fixed amount.

The flash exposure compensation amount selection operation of the camera 100 according to this embodiment will be described below with reference to the flowchart shown in FIG. 2.

An operation related to autoflash exposure compensation setting of the external flash will be described here. A fixed flashlight amount (manual light emission) can also be set by the same operation, and a description thereof will not be repeated. That is, the present invention is applicable not only to setting of a compensation amount but also to setting a flashlight amount (flash exposure).

If the external flash 112 has a function (e.g., a flash exposure compensation button) capable of setting the flash exposure compensation amount on a standalone basis, the flash exposure compensation amount locally set in the external flash 112 may be different from that set in the camera 100. In this case, the camera 100 of this embodiment determines the final flash exposure compensation amount in the following way.

When the flash exposure compensation amount (to be referred to as a locally set flash exposure compensation amount) locally set, for example, from the flash exposure compensation button of the external flash 112 is 0, the flash exposure compensation amount designated from the camera 100 is enabled.

When the flash exposure compensation amount locally set, for example, from the flash exposure compensation button of the external flash 112 is not 0, the flash exposure compensation amount designation from the camera 100 is ignored, and only the locally set flash exposure compensation amount is enabled.

This operation will be described with reference to the flowchart shown in FIG. 2.

In step S400, the system control circuit 50 inquires of the external flash 112, for example, using serial communication via the accessory shoe 110 whether it is a model capable of locally setting a flash exposure compensation amount.

If it is determined by the inquiry that the model can locally set a flash exposure compensation amount, the system control circuit 50 inquires of the external flash 112, for example, using serial communication via the accessory shoe 110 whether it has a locally set flash exposure compensation amount.

If it is determined by the inquiry that the external flash 112 has a locally set flash exposure compensation amount (YES in step S401), the process advances to step S402. In step S402, the system control circuit 50 executes autoflash exposure without any instruction to the external flash 112 even when a flash exposure compensation amount is set via the operation unit 70.

Flash photography is carried out while enabling only the compensation amount locally set in the external flash 112.

On the other hand, if it is determined in step S400 that the external flash 112 is not a model capable of locally setting a flash exposure compensation amount, or if it is determined in step S401 that the external flash 112 is a model capable of locally setting a flash exposure compensation amount but has no locally set compensation amount, the process advances to step S403.

In step S403, the system control circuit 50 checks the presence/absence of a flash exposure compensation amount set via the operation unit 70. If it is determined that a flash exposure compensation amount is set in the camera 1001 the process advances to step S404. In step S404, the system control circuit 50 enables the flash exposure compensation amount set in the camera 100.

In flash photography, the autoflash exposure amount compensated by the system control circuit 50 is designated to the external flash 112.

If it is determined in step S403 that no flash exposure compensation amount is set via the operation unit 70, the process advances to step S405.

In this case, neither the external flash 112 nor the camera 100 has a set flash exposure compensation amount. The system control circuit 50 executes normal autoflash exposure without flash exposure compensation in flash photography.

Figure 3A:
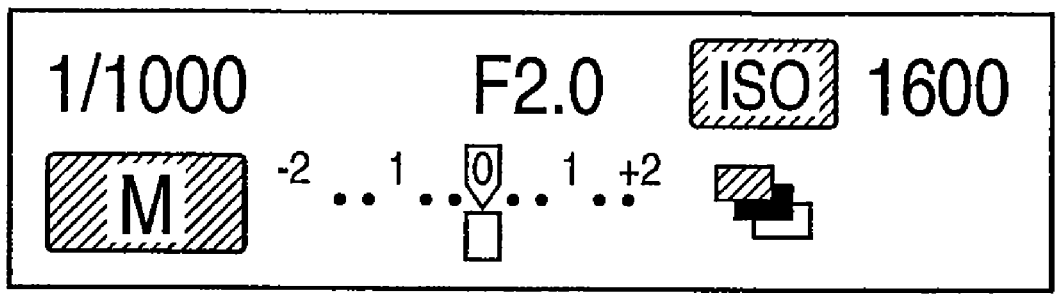
FIGS. 3A to 3C are views showing display examples of information about flash exposure compensation on a display unit 54 of the camera 100 according to the embodiment of the present invention.
Figure 3B:
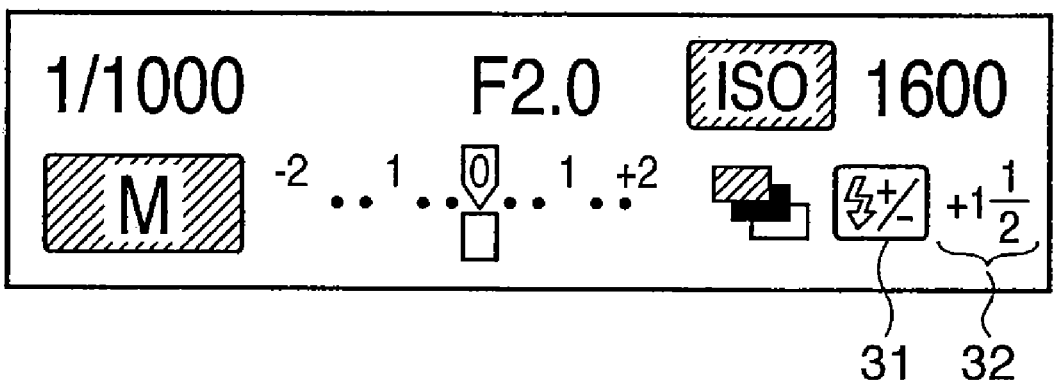
Figure 3C:
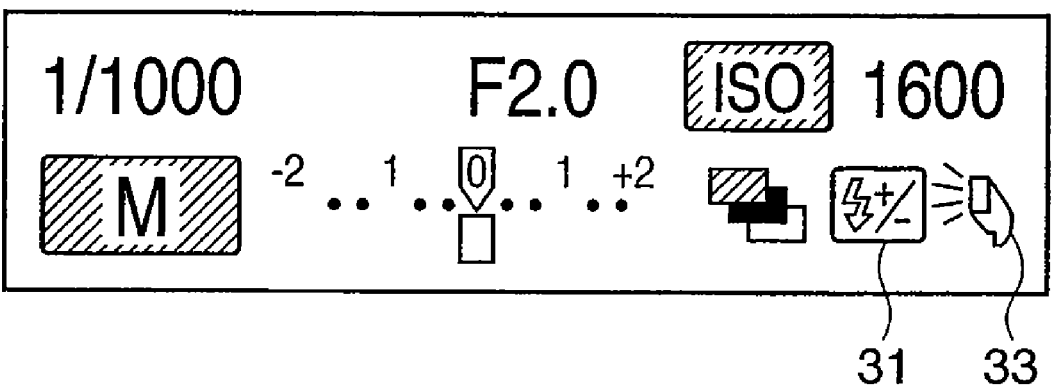

FIGS. 3A to 3C are views showing display examples of information about flash exposure compensation on the display unit 54 of the camera 100 of this embodiment. These displays are implemented by causing the system control circuit 50 to control the contents of the display unit 54 on the basis of the determination result of the flash exposure compensation amount described with reference to the flowchart in FIG. 2.

FIG. 3A shows a display example when neither the external flash 112 nor the camera 100 has a set flash exposure compensation amount (step S405 in FIG. 2).

FIG. 3B shows a display example when the flash exposure compensation amount set in the camera 100 is enabled (step S404 in FIG. 2).

FIG. 3C shows a display example when the flash exposure compensation amount locally set in the external flash 112 is enabled (step S402 in FIG. 2).

As shown in FIG. 3B, when the flash exposure compensation amount set in the camera 100 is enabled, a mark 31 indicating that the compensation is ON and a compensation amount (+1.5 step) 32 set in the camera 100 are displayed.

As shown in FIG. 3C, when the flash exposure compensation amount locally set in the external flash 112 is enabled, the mark 31 indicating that the compensation is ON and a mark 33 indicating that a flash exposure compensation amount is set in the external flash 112 are displayed.

If flash exposure compensation will not be executed, the display unit 54 displays none of the marks 31 to 33 which are displayed when flash exposure compensation is ON, as shown in FIG. 3A.

As described above, the digital still camera 100 of this embodiment displays information (mark 31) indicating that flash exposure compensation is ON or OFF and an indicator (compensation amount 32 or mark 33) that changes depending on the set location of the enabled compensation amount.

Hence, even if the user forgets to set the flash exposure compensation amount in the external flash 112 and sets a new flash exposure compensation amount in the camera 100, he/she can understand from the contents of the display unit 54 that the flash exposure compensation amount set in the external flash 112 is enabled.

In this embodiment, when an external flash capable of locally setting a flash exposure compensation amount is used, and a flash exposure compensation amount locally set in the external flash exists, only the flash exposure compensation amount set in the external flash is enabled. The display unit 54 displays a mark indicating that the flash exposure compensation amount set in the external flash is enabled. Hence, the user can clearly and easily understand before image capture whether the flash exposure compensation amount intended by himself/herself will be applied.

In this embodiment, the contents (marks) of the display unit 54 change depending on the set location of the enabled compensation amount. The user may be given notice of it by another method such as character string display or sound output. When the external flash 112 has a display device, the display device of the external flash 112 may be used to give the user notice of the set location of the compensation amount enabled for the next image capture. In this case, the system control circuit 50 transmits, for example, a predetermined display command to the external flash 112 via the accessory shoe (I/F) 110 in addition to (or instead of) display control of the display unit 54. The control circuit (not shown) of the external flash 112 interprets the command and changes the contents of the display device.

Second Embodiment

In the first embodiment, display on the display unit 54 of the camera 100 is controlled to give the user notice of information about an enabled flash exposure compensation amount.

However, the user may forget that he/she has locally set a flash exposure compensation amount in the external flash 112.

In the second embodiment, when a user who has already locally set a flash exposure compensation amount in an external flash 112 is going to set another flash exposure compensation amount in a camera 100 via an operation unit 70, he/she is given notice of it. Thus, the user can know that the flash exposure compensation amount has already been set in the external flash 112 at that point in time when he/she is about to set the flash exposure compensation amount in the camera 100. Additionally, showing the presence of the flash exposure compensation amount already set in the external flash 112 on the flash exposure compensation amount setting screen of the camera 100 gives notice more reliably.

Figure 5:
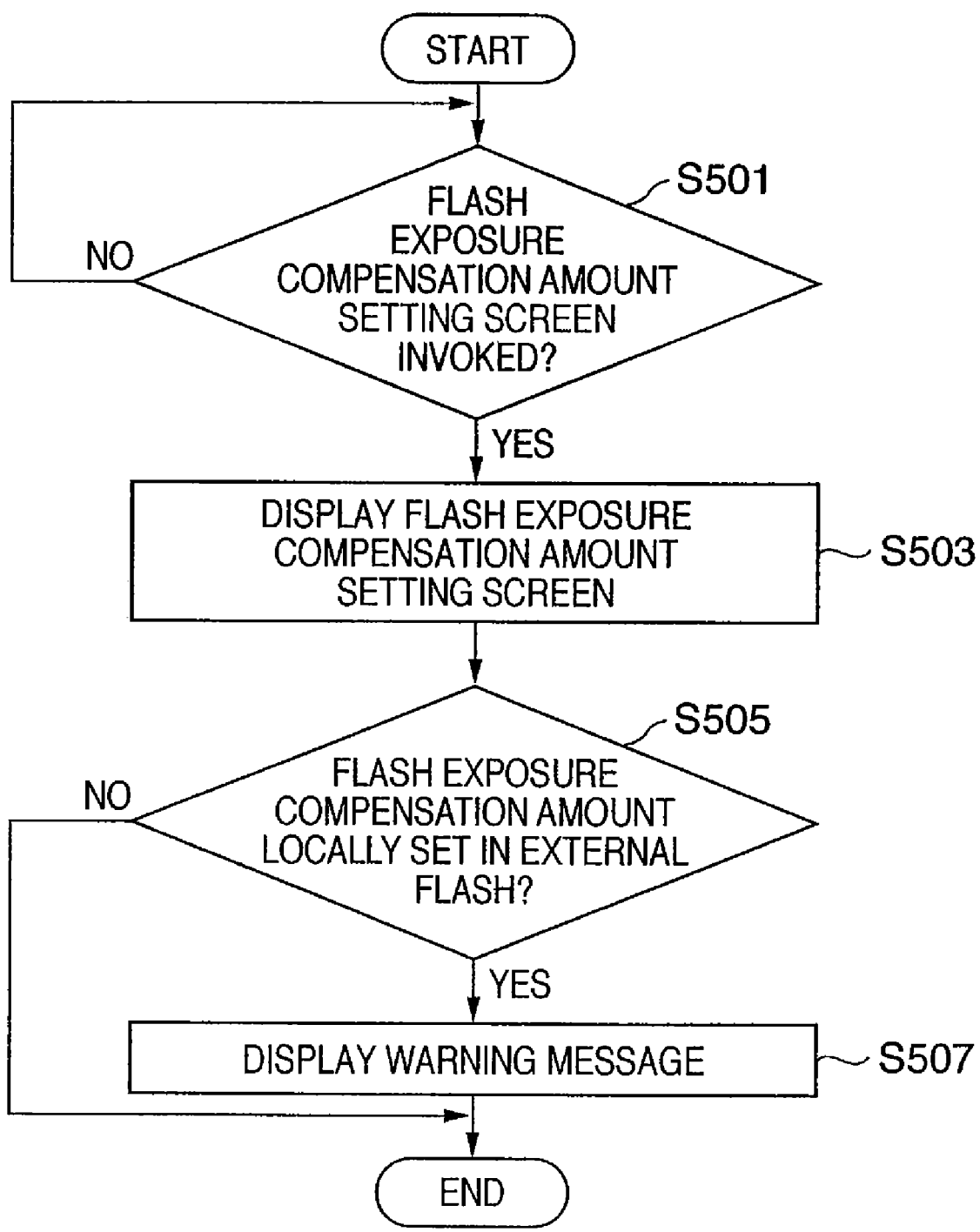
FIG. 5 is a flowchart for explaining the flash exposure compensation amount setting screen display process of a camera 100 according to the second embodiment of the present invention.

FIG. 5 is a flowchart for explaining the flash exposure compensation amount setting screen display process of the digital still camera according to this embodiment.

The digital still camera of this embodiment has the same arrangement as in the first embodiment, and a description thereof will not be repeated.

In step S501, a system control circuit 50 checks whether the user has invoked the flash exposure compensation amount setting screen via the operation unit 70. The user can invoke the flash exposure compensation amount setting screen by accessing it through the layers of menus generally used in an apparatus of this type, using, for example, the menu buttons, cursor keys, and enter key included in the operation unit 70. A button assigned the function of invoking the flash exposure compensation amount setting screen may be provided. In this case, the setting screen is displayed in response to a user pressing this button.

If invocation of the flash exposure compensation amount setting screen is detected in step S501, the system control circuit 50 displays the setting screen on, for example, an image display unit 28 in step S503. The display data of the setting screen is registered in advance in, for example, a nonvolatile memory 56. If the external flash 112 is connected, the system control circuit 50 inquires of the external flash 112 whether a flash exposure compensation amount is locally set (S505).

If it is determined that a flash exposure compensation amount is locally set in the external flash 112, the system control circuit 50 displays a warning message on the flash exposure compensation amount setting screen (S507).

Figure 4:
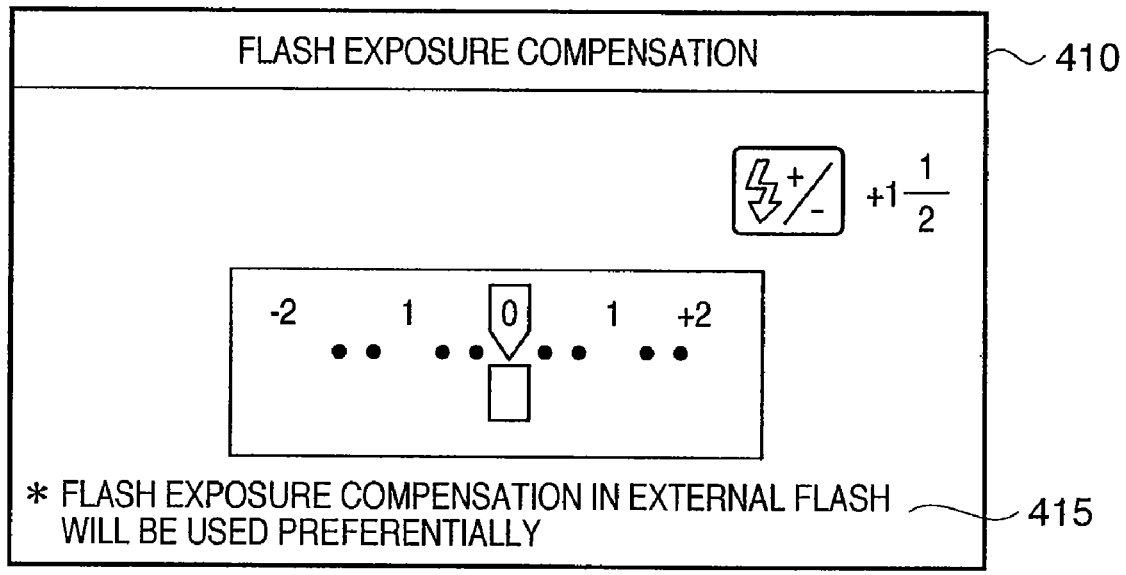
FIG. 4 is a view showing the flash exposure compensation amount setting screen of a camera 100 according to the first embodiment of the present invention.

FIG. 4 is a view showing the flash exposure compensation amount setting screen. A setting screen 410 shown in FIG. 4 includes a warning message 415.

As described above, in this embodiment, the setting screen 410 to set a flash exposure compensation amount in the camera 100 gives information indicating that the flash exposure compensation amount set in the external flash 112 is enabled. Hence, even when the user forgets that a flash exposure compensation amount is locally set in the external flash 112, he/she can be given notice of it. This prevents any situation in which the user sets flash exposure compensation amounts in both the external flash 112 and the camera 100, and image capture is performed on the basis of an undesirable flash exposure compensation amount.

If no flash exposure compensation amount is set in the external flash 112, or the compensation amount set there is 0 in step S505, no warning message is displayed.

The processing steps S505 and S507 may be repeated until the flash exposure compensation amount setting screen switches to another screen (e.g., when setting is canceled, or execution of setting is instructed). If the user recognizes the display in FIG. 4 and cancels the setting on the side of the external flash 112, the warning message in the display may be erased, reflecting this operation. In this case, a step of erasing the warning message in the display is inserted after NO in step S505.

In this embodiment, the warning message may be displayed either when a substantial flash exposure compensation amount is set in the external flash 112 or when a compensation amount of 0 is set. The user may be given notice by an arbitrary method besides message display and, for example, sound output.

Third Embodiment

In the second embodiment, when a flash exposure compensation amount is locally set in the external flash 112, the flash exposure compensation amount setting screen of the digital still camera gives notice of it.

As a characteristic feature of the third embodiment, when a flash exposure compensation amount is locally set in an external flash 112, setting the flash exposure compensation amount in the digital still camera is not permitted.

Figure 6:
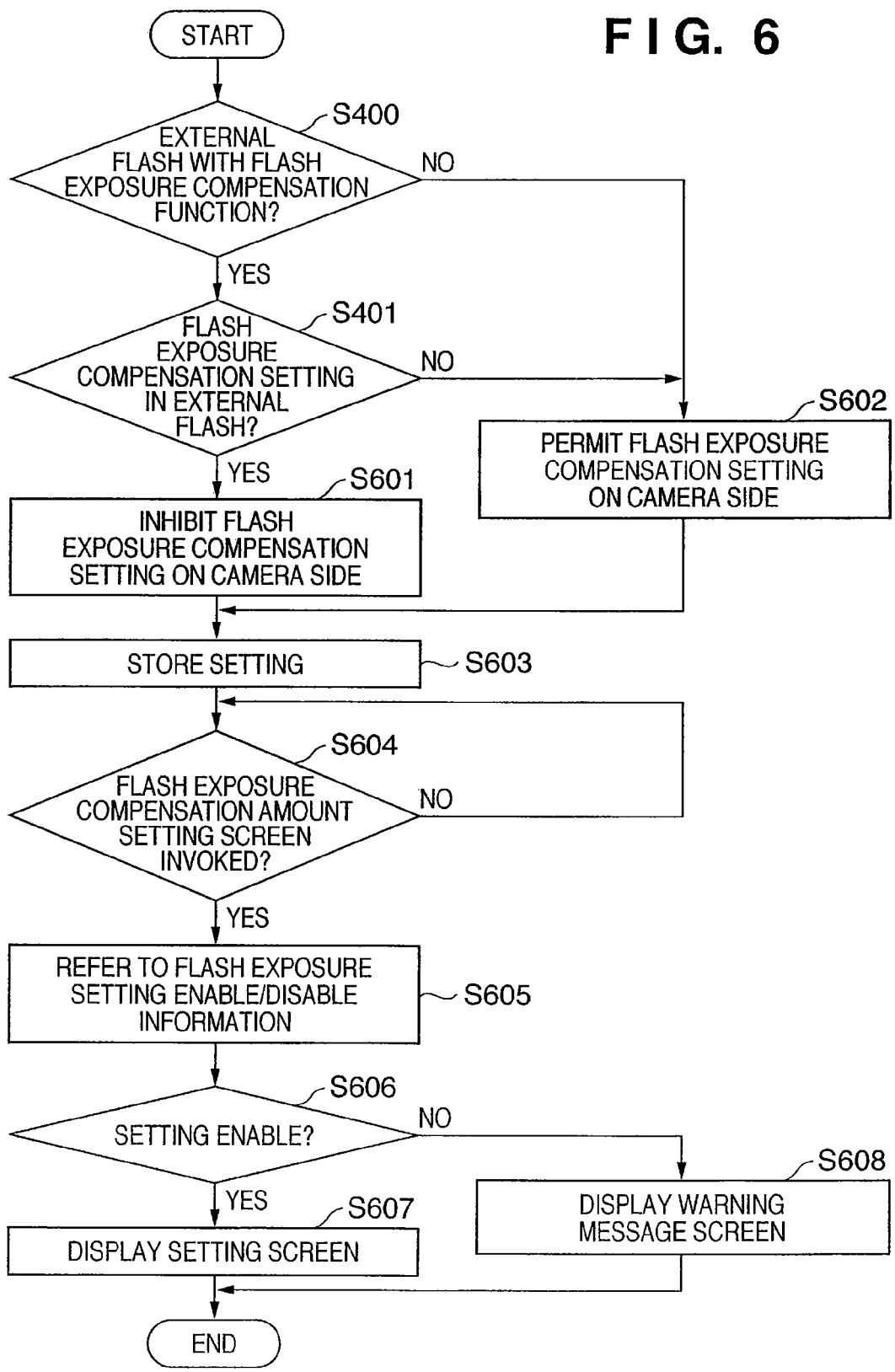
FIG. 6 is a flowchart for explaining the flash exposure compensation amount setting screen display process of a camera 100 according to the third embodiment of the present invention.

FIG. 6 is a flowchart for explaining the flash exposure compensation amount setting screen display process of the digital still camera according to this embodiment. The same step numbers as in FIG. 2 denote the same processes in FIG. 6.

The digital still camera of this embodiment has the same arrangement as in the first embodiment, and a description thereof will not be repeated.

In steps S400 and S401, a system control circuit 50 checks whether the external flash 112 is a model with a function allowing local setting of a flash exposure compensation amount, and if YES, whether a flash exposure compensation amount is set.

If it is determined that the external flash 112 has a locally set flash exposure compensation amount, the system control circuit 50 inhibits flash exposure compensation amount setting in a camera 100 (S601).

If the external flash 112 is a model incapable of locally setting a flash exposure compensation amount, or if no flash exposure compensation amount is set, the system control circuit 50 permits flash exposure compensation amount setting in the camera 100 (S602).

The system control circuit 50 stores, for example, in a nonvolatile memory 56, the information (setting enable/disable information) representing the flash exposure compensation amount setting enable/disable state of the camera 100 (S603). When a flash exposure compensation amount setting screen is invoked (YES in step S604), whether setting is permitted is determined by referring to the setting enable/disable information (S606).

Figure 7:
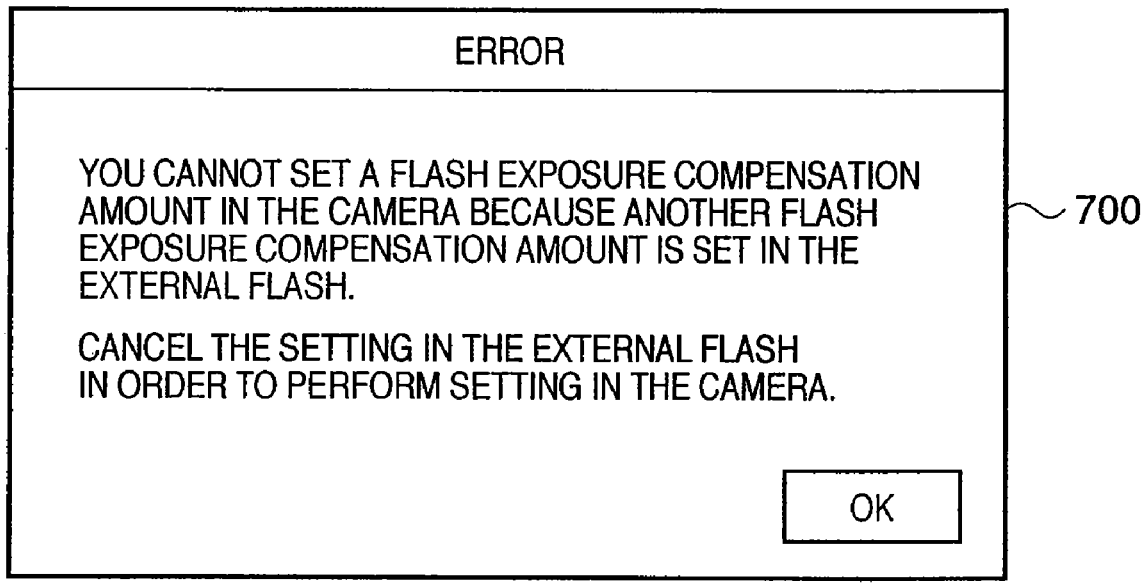
FIG. 7 is a view showing a display example of a warning message of the camera 100 according to the third embodiment of the present invention.

If it is determined that setting is permitted, the system control circuit 50 displays the flash exposure compensation amount setting screen on an image display unit 28 (S607). If it is determined that setting is not permitted, the system control circuit 50 displays a warning message on the image display unit 28. FIG. 7 is a view showing a display example of a warning message 700. In this way, the user is given notice that setting in the camera 100 is not possible because a flash exposure compensation amount is already set in the external flash 112, and the setting in the external flash 112 must be canceled in order to allow setting in the camera 100.

As described above, in this embodiment, when a flash exposure compensation amount is locally set in the external flash 112, flash exposure compensation amount setting on the camera side is not permitted. Hence, even if the user forgets that a flash exposure compensation amount is locally set in the external flash 112, he/she can reliably be prevented from setting flash exposure compensation amounts in both the external flash 112 and the camera 100.

Other Embodiments

In the embodiments, only the arrangement that enables a flash exposure compensation amount set in the external flash and disables a flash exposure compensation amount set in the camera has been described. However, the essence of the present invention is to give notice of enabled and disabled flash exposure compensation amounts set in the external flash and camera. Hence, if the flash exposure compensation amount set locally in the external flash can be disabled, setting on the camera side may be enabled, and setting on the external flash side may be disabled, as a matter of course.

In enabling setting on the camera side, the contents of the warning message shown in FIG. 4 may change, for example, to "the flash exposure compensation amount set in the external flash will be ignored". That is, the warning message displayed in the setting screen is included in the indicator that changes depending on the set location of the enabled compensation amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-152761, filed on May 31, 2006, which is hereby incorporated by reference herein in its entirety.

What is claimed is:

1. An image pickup apparatus capable of controlling of an amount of flashlight of an external flash connected to the image pickup apparatus, comprising:
    a first input unit configured to receive an input of information relating to a control of the amount of flashlight;
    a selection unit configured to select, in case where information relating to the control of the amount of flashlight is inputted via both the first input unit and a second input unit included in the external flash, one of the inputted information relating to the control of the amount of flashlight based on which the amount of flashlight of the external flash should be controlled; and
    a notification unit configured to notify information representing a selection result of the selection unit,
    wherein the notification unit notifies information representing that the information relating to the control of the amount of flashlight has been inputted via the second input unit.

2. An image pickup apparatus capable of controlling of an amount of flashlight of an external flash connected to the image pickup apparatus, comprising:
    a first input unit configured to receive an input of information relating to a control of the amount of flashlight;
    a selection unit configured to select, in case where information relating to the control of the amount of flashlight is inputted via both the first input unit and a second input unit included in the external flash, one of the inputted information relating to the control of the amount of flashlight based on which the amount of flashlight of the external flash should be controlled; and a notification unit configured to notify information representing a selection result of the selection unit, wherein the selection unit gives a priority to information relating to the control of the amount of flashlight inputted via the first input unit in the selection.

3. A camera system including an image pickup apparatus and an external flash connected to the image pickup apparatus, comprising:

a light-emitting unit;

a first input unit included in the camera and configured to receive an input of information relating to a control of the amount of flashlight of the light-emitting unit;

a second input unit included in the external flash and configured to receive an input of the information relating to the control of the amount of flashlight;

a selection unit configured to select, in case where information relating to the control of the amount of flashlight is inputted via both the first input unit and a second input unit, one of the inputted information relating to the control of the amount of flashlight based on which the amount of flashlight of the light-emitting unit should be controlled; and a notification unit configured to notify information representing a selection result of the selection unit;

wherein the selection unit gives a priority to information relating to the control of the amount of flashlight inputted via the first input unit in the selection.

* * * * *